No. 890,498. PATENTED JUNE 9, 1908.
M. C. CLARK.
APPARATUS FOR CLEANSING RUBBER.
APPLICATION FILED MAR. 28, 1907.
3 SHEETS—SHEET 1.
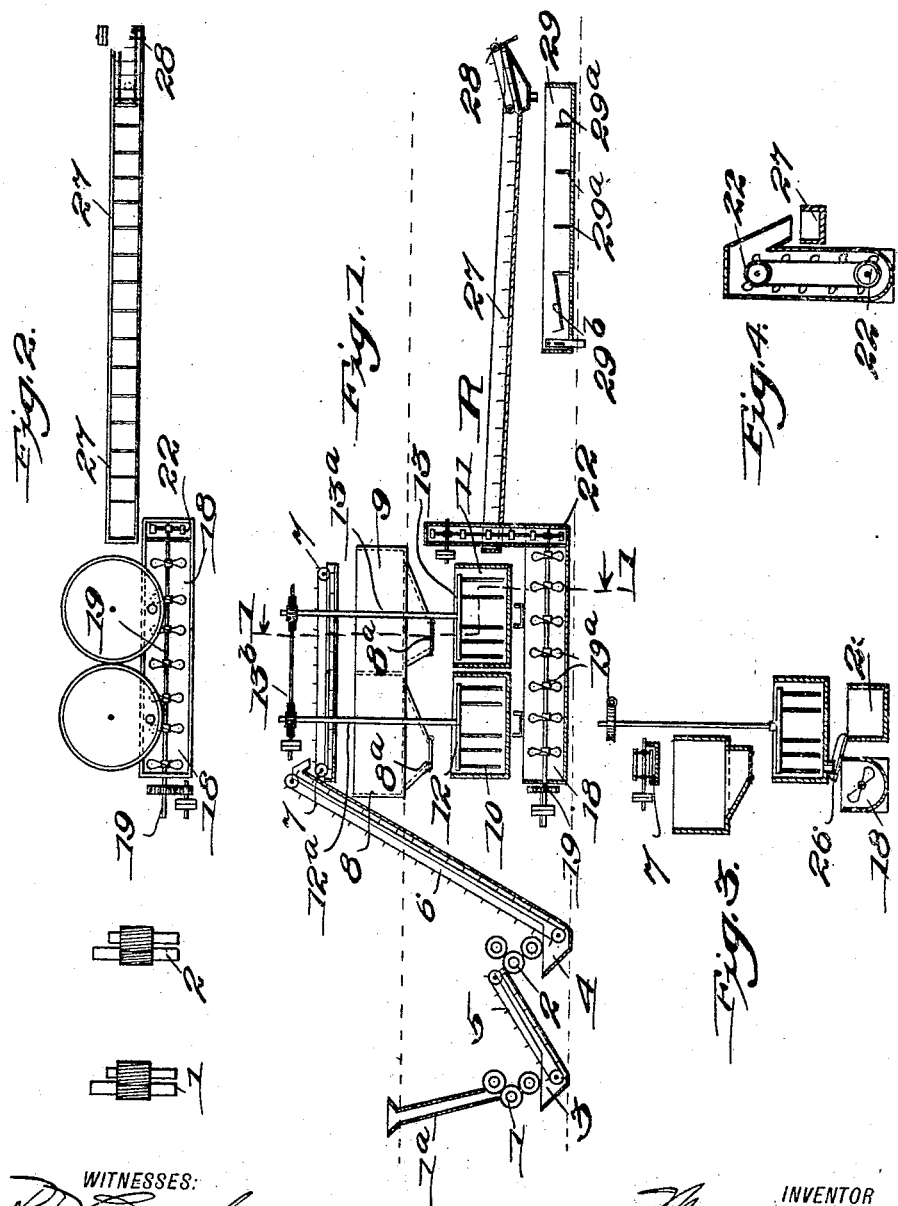

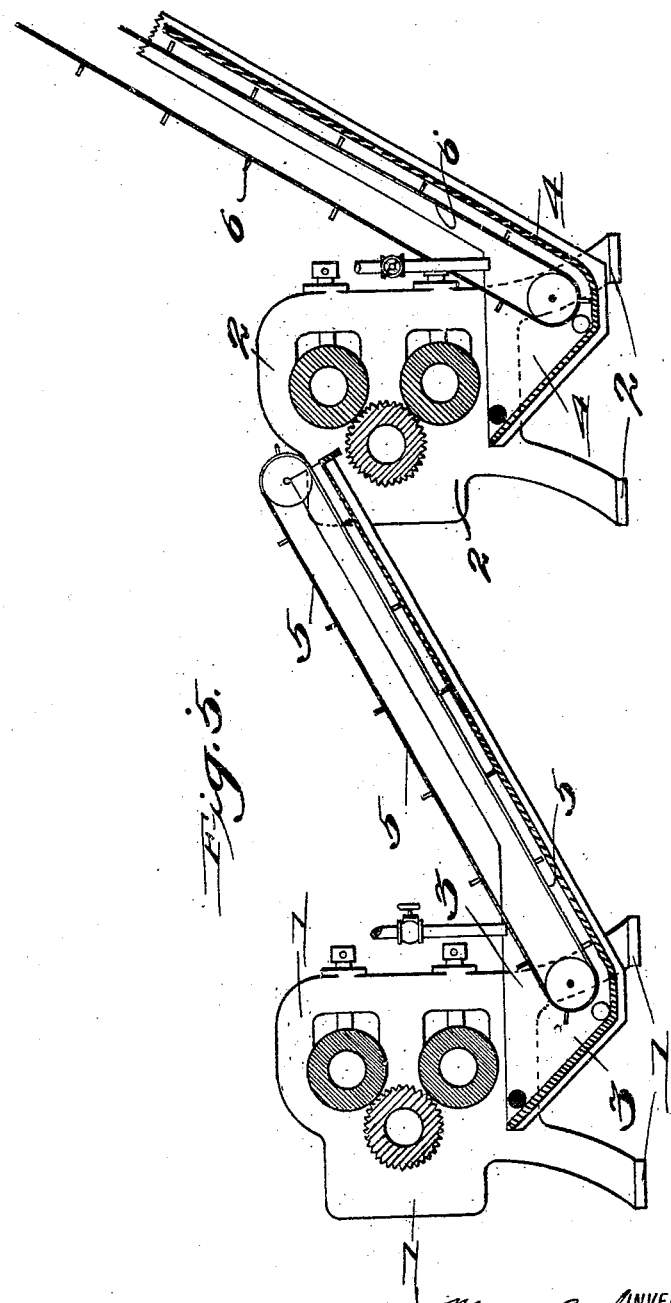

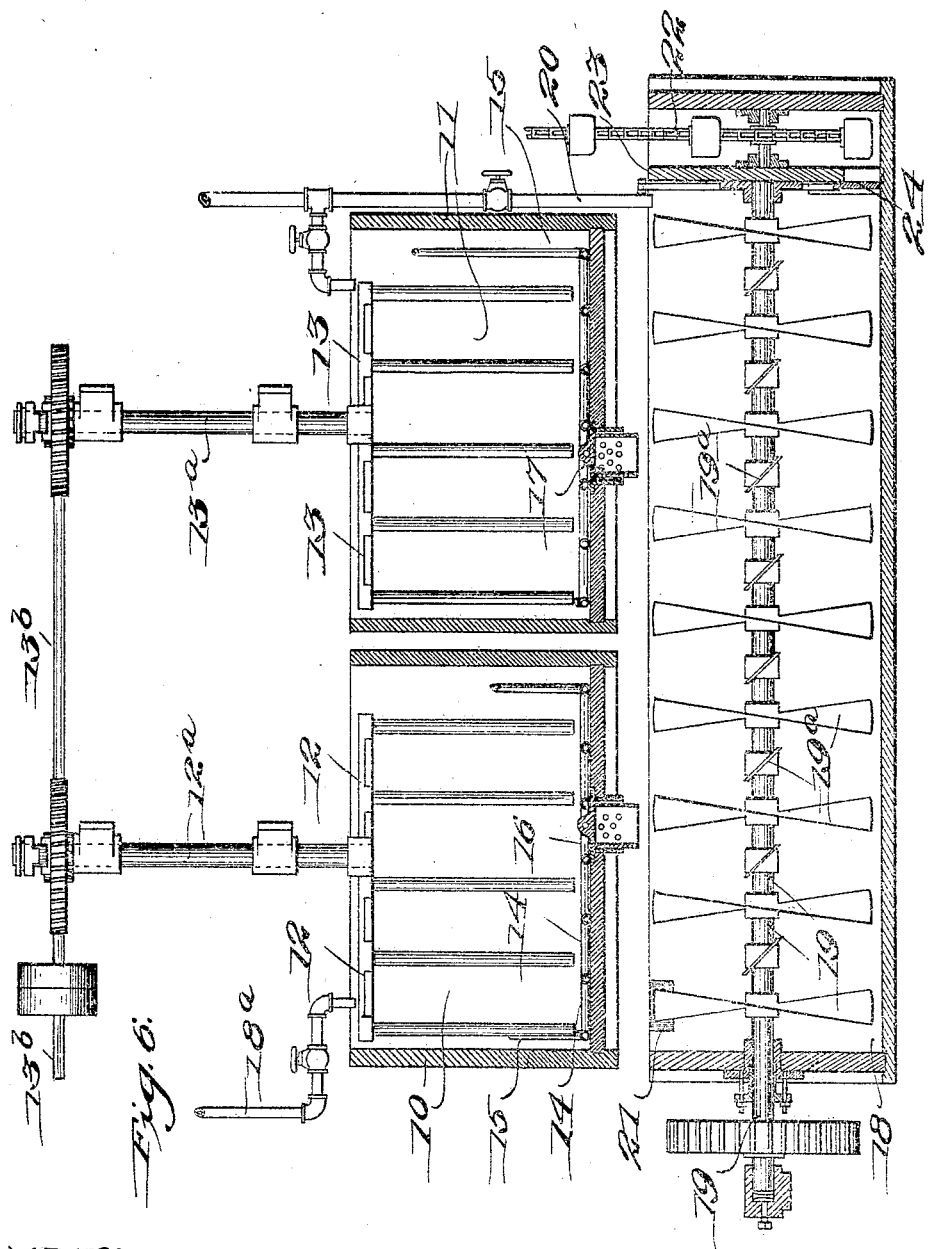

UNITED STATES PATENT OFFICE.

MAURICE C. CLARK, OF PROVIDENCE, RHODE ISLAND.

APPARATUS FOR CLEANSING RUBBER.

No. 890,498.   Specification of Letters Patent.   Patented June 9, 1908.

Application filed March 28, 1907. Serial No. 365,187.

*To all whom it may concern:*

Be it known that I, MAURICE C. CLARK, a citizen of the United States, and a resident of Providence, in the county of Providence and State of Rhode Island, have invented a new and useful Improvement in the Apparatus for Cleansing Rubber, of which the following is a specification.

This invention relates to an apparatus for cleansing rubber and has particular application to the treatment of old vulcanized rubber scrap such as boots, shoes, hose, tires, and the like, preparatory to the process of devulcanization.

The processes heretofore followed in the reclaiming of old vulcanized scrap rubber have been slow and expensive, due primarily to the fact that much manual labor has been required in the handling of the material to the several necessary operations, and also that the apparatus used in the cracking, washing and conveying of the rubber has been of such character as to curtail the output.

By the employment of my invention the maximum output of product with a minimum expenditure of time and labor can be obtained and, further more, a larger per centage of the stock itself may be saved by my process and such stock is better refined than the stock treated by prior processes.

In the accompanying drawings I have shown a preferred form of apparatus by which my invention may be carried into effect, but I wish it to be understood that I do not limit myself to the precise details of construction herein delineated as there may be modification and variation without departing from the spirit or scope of the invention. In the preparation of vulcanized rubber scrap for devulcanizing several distinct operations are necessary to clean the stock and free the same from metal, sand and other particles of foreign matter before subjecting it to the process of devulcanization. For instance, the scrap must be separated from particles of cloth and the like, clinging thereto and also buckles, rivets, eyelets and other metallic articles usually attached to boots and shoes. By means of my invention I correlate the several operations in such manner as to obtain a continuous system, the stock being carried automatically from one operation to another until it is ready for devulcanization.

In the accompanying drawings like characters of reference indicate like parts in all the views, and Figure 1 is a longitudinal sectional side elevation showing my apparatus; Fig. 2 is a plan view of the same; Fig. 3 is a vertical cross section taken through the acid-boiling tank, washing tank, storage bin and an acid catch-basin, on the line 1—1 of Fig. 1; Fig. 4 is a vertical cross section through the elevator at the end of the wash tank; Fig. 5 is a sectional elevation showing the cracking mechanism, the conveyers and rinsing tanks; Fig. 6 is a longitudinal sectional elevation of the acid boiling tanks and the washing tanks such as shown in Fig. 1.

Referring now to the accompanying drawings in detail, the numerals 1 and 2 indicate the roll cracking mechanism for cracking the rubber, the latter being deposited initially in the chute $1^a$. Beneath the cracking rollers 1 is located a rinsing tank 3, and a similar tank 4 is located beneath the cracker 2, the material being carried by the belt conveyer 5, from the tank 3 to the crackers 2. From the tank 4 the stock is carried by the endless drag conveyer 6 and delivered to the horizontal conveyer 7, which in turn, transfers the stock to the storage bins 8 and 9. Each of these storage tanks is provided with an open bottom portion $8^a$ and $8^a$, respectively, closed by a suitable slide or door and beneath the bins are arranged the acid boiling tanks 10 and 11, provided with stirring or agitating devices 12 and 13 respectively connected to the shafts $12^a$ and $13^a$ and driven in a suitable manner from the shaft $13^b$. These acid tanks are shown in detail in Fig. 6, the tank 12 being supplied with the steam heating coil 14, while the tank 13 is supplied with a similar steam coil 15 and such tanks are further provided with valves 16 and 17 respectively, in the base thereof for discharging the stock into the washing tank 18. Extending through the washer tank is the shaft 19 provided with a series of propeller blades $19^a$ for agitating the stock. This tank is supplied with water by means of the pipe 20 and is provided with an overflow 21 for carrying off the water and acid combined after the stock has been washed. At one end of the tank is a bucket elevator 22 separated from the main portion of the tank by the partition 23, a movable guide as at 24, when raised, permitting the stock to flow into the elevator boot from whence it is lifted by the elevator and discharged into the refining mechanism R.

25 is a receptacle arranged beneath the acid tanks and alongside the washing tanks for receiving the acid solution which is drawn from the acid boiling tanks after the process of boiling is completed, and 26 is an adjustable trough or shoe arranged to deliver material either into the washing tank or into the tank for the acid solution, as is clearly shown in Fig. 3.

The refining mechanism R comprises a trough 27 inclined toward the point of delivery and having adjustable curved gates set at certain intervals throughout its length, these gates having mechanical connections whereby the operator can set them all simultaneously, or at any angle from horizontal to vertical, or can raise it simultaneously to allow the flushing of the refuse collected from the bottom of the refining machine. A drag conveyer 28 is provided for discharging the refined product into a devulcanizing car or other desired receptacle, and 29 is a catch basin through which all water from the refining trough 27 passes. As the refining mechanism just described forms the subject-matter of an application executed by me as of even date herewith, I do not in this case make any claim to the construction of such tank, as the latter is claimed *per se* in the aforesaid specification.

The operation of the whole apparatus forming the subject-matter of this application is as follows: The vulcanized rubber scrap is fed into the hopper or chute leading to the cracker 1, and passes into the rinsing tank 3, which is supplied with water and with an overflow for carrying off the dirty water, as is shown in Fig. 5. The drag conveyer 5 collects the stock in the tank 3 and discharges the same through the cracker 2 and such stock after passing through the last cracker is discharged into the tank 4 which is preferably a duplicate of the tank 3. From the tank 4 the stock is taken by the drag conveyer 6 and delivered to the horizontal conveyer 7 which, in turn, transfers the stock to the storage bins 8 and 9. In practice one of the storage bins is filled and feeding the stock into the acid tank therebeneath while the crackers are taking on a supply for the other storage bin. The acid tank is filled with a solution of any suitable sort, such as sulfuric acid and water of the proper strength and quality. Steam is then turned into the coils in the bottom of the tank and the stirring mechanism actuated. The chute in the bottom of the storage bin is then opened filling the acid-boiling tank with the proper amount of stock. This operation of boiling the acid is employed to remove any textile material, such as is usually combined with rubber in the making of tires, boots, shoes and the like. When the boiling process is completed the stirring mechanism is stopped, steam shut off from the coils, and the valve in the bottom of the tank is raised a short distance from its seat, thus allowing the solution in the boiling tank to drain off through the perforations in the extension of the valve, and by means of the adjustable trough 26 the acid flows to the catch-basin 25. When the solution has been drained off from the stock the direction of the adjustable trough is reversed so as to discharge into the washing tank 18, the valve in the bottom of the boiling tank being entirely withdrawn and the stock is flushed out into the wash tank by means of the water supply pipe 18$^a$, as is shown in Fig. 6. Within the wash tank the stock is agitated by means of the propeller blades on the shaft 19 which are rotated in the proper direction to project or force the stock toward the end wherein is located the bucket elevator 22. During the agitating process, which is employed primarily for the purpose of washing the acid out of the material the gate 24 and partition 23 are closed so that no stock is permitted to enter the elevator boot and a supply of water is kept flowing in through the pipe 20 and the dirty water is allowed to flow off into the screen outlet or conduit 21. After a proper cleansing in the washing tank 18 the water is shut off, the gate 24 raised, the elevator 22 set in motion and the stock discharged in uniform quantities into the refining machine 27, the shaft 19 being kept revolving and the propeller blades forcing the stock into the elevator boot until the washing tank is empty. While washing the batch of stock from one acid boiling tank another batch will be boiling in the next tank and vice versa.

The refining machine R has the trough 27 inclined toward the delivery end and is furnished with a supply of water at the end where it receives the stock from the bucket elevator 22, as is described in my application aforesaid. The adjustable curved gates having been set in proper position the stock is carried by the force of the water over the top edge of the gates and down the incline toward the drag conveyer 28. All heavier substances of foreign matter such as gravel, particles of metal and the like, will be held back by the gates and dropped to the bottom of the trough, while all the clean refined stock will be carried to the drag conveyer and from thence delivered to a devulcanizing car or other receptacle. Under the drag conveyer 28 is a perforated screen which allows the water to pass through and discharge by gravity to a catch-basin or settling tank below.

During the cracking and boiling operations a portion of the stock may be ground or pulverized so fine that it will pass through a finely meshed screen, and the object of the catch-basin or settling tank is to retain this fine stock that has escaped from the refining machine through the screen at the delivery end of the latter. The catch-basin is preferably divided into several compartments by means of adjustable gates 29ª, the water filling these compartments and passing on to and through the inclined screen 29ᵇ to a suitable point of discharge.

From the above description the construction and operation of the apparatus will be readily understood and it is noted that I have provided an arrangement by which the rubber scrap or such stock may be rapidly, cheaply and efficiently prepared for devulcanization.

Having thus described my invention, what I claim is:

1. The combination of cracking mechanism, a storage tank, a conveyer located between the cracking mechanism and the storage tank, an acid tank, a wash tank located adjacent to the acid tank, refining mechanism, and means for conveying the material from the acid tank to the refining mechanism.

2. The combination with the cracking or breaking mechanism, the storage tanks, means for conveying the material from the cracking mechanism to the storage tanks, the acid tanks below the storage tanks, stirring mechanism within the acid tanks, the wash tank adjacent to the acid tank and adapted to receive material therefrom, agitating mechanism within the wash tank, refining mechanism, and means for conveying material from the wash tank to the refining mechanism.

3. The combination with the cracking mechanism, conveying means for conveying material from the cracking mechanism, a boiling tank, a wash tank located adjacent to the boiling tank, refining mechanism, and means for conveying the material from the wash tank to the refining mechanism.

4. The combination of a primary set of cracking rolls, a secondary set of cracking rolls, means for conveying material from the primary to the secondary set of cracking rolls, a boiling tank, a wash tank, refining mechanism, and means for conveying the material from the wash tank to the refining mechanism.

5. The combination with the cracking rolls, conveying mechanism for taking material therefrom, a horizontally disposed conveyer, a storage tank located adjacent to the horizontal conveyer, a boiling tank beneath the storage tank, stirring mechanism for the boiling tank, means for washing the stock after it has been removed from the boiling tank, and means for refining the stock.

6. The combination of the cracking mechanism, a storage tank, means for conveying the material from the cracking mechanism to the storage tank, a boiling tank located beneath the storage tank, and stirring mechanism within the boiling tank.

7. The combination of the cracking mechanism, a storage tank, a series of conveyers for carrying the material from the cracking mechanism to the storage tank, a boiling tank for receiving the material from the storage tank, stirring mechanism within the boiling tank, a wash tank, means for conveying the material from the boiling tank to the wash tank, and means for agitating the material within the wash tank.

8. In an apparatus of the class described, a storage tank, a boiling tank located beneath the storage tank and designed to receive material passing through an opening in the storage tank, mechanically operated storing mechanism in the boiling tank, a wash tank located adjacent to and designed to receive the material from the boiling tank and mechanically operated agitating mechanism in the wash tank.

9. In an apparatus of the class described a tank within which the material is boiled, a wash tank located adjacent to the boiling tank, and to which the material passes through an opening in the boiling tank, refining mechanism, and conveying mechanism for carrying the washed material from the washing tank to the refining mechanism.

10. The combination of the primary cracking roll, the secondary cracking rolls, conveying mechanism for taking material from the primary to the secondary cracking rolls, the boiling tank within which the material is boiled, the wash tank within which the material is washed, the refining mechanism, and means for conveying the material from the wash tank to the refining mechanism.

11. The combination of the cracking mechism, the boiling tank within which the material is boiled after it has been cracked, stirring mechanism within the boiling tank, the wash tank, agitating mechanism within the wash tank, a receptacle for the reception of the fluid from the boiling tank, a refining mechanism, and means for removing the material from the acid tank to the refining mechanism.

12. The combination of the boiling tank within which the material is boiled in acid or the like, the wash tank adjacent to the boiling tank, a receptacle for acid flowing from the boiling tank, stirring mechanism within such boiling tank, agitating means within the wash tank, and means for removing the material from the wash tank after it has been washed.

In testimony whereof I have hereunto signed my name to this specification in the presence of two subscribing witnesses.

MAURICE C. CLARK.

Witnesses:
RICHARD B. CAVANAGH,
W. A. PAULING.